United States Patent
Blanc et al.

(10) Patent No.: US 8,665,573 B2
(45) Date of Patent: Mar. 4, 2014

(54) DEVICE FOR PROTECTING AN ELECTRICAL CONSUMER AGAINST VOLTAGE SPIKES IN A MOTOR VEHICLE

(75) Inventors: Martin Blanc, Knittlingen (DE); Josef Mueller, Pforzheim (DE); Keith Wilson, Tuerkismuehle (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 453 days.

(21) Appl. No.: 13/043,758

(22) Filed: Mar. 9, 2011

(65) Prior Publication Data
US 2011/0216458 A1     Sep. 8, 2011

(30) Foreign Application Priority Data
Mar. 3, 2010   (DE) .................. 10 2010 011 043

(51) Int. Cl.
*H02H 9/00* (2006.01)
(52) U.S. Cl.
USPC ........................................................ 361/91.1
(58) Field of Classification Search
USPC ........................................................ 361/91.1
See application file for complete search history.

(56) References Cited

U.S. PATENT DOCUMENTS

| | | | |
|---|---|---|---|
| 4,809,122 A * | 2/1989 | Fitzner | 361/18 |
| 6,031,701 A | 2/2000 | Maeckel et al. | |
| 6,288,881 B1 * | 9/2001 | Melvin et al. | 361/18 |
| 6,727,555 B2 * | 4/2004 | Heinisch et al. | 257/355 |
| 7,187,530 B2 | 3/2007 | Salling et al. | |
| 2004/0257742 A1 | 12/2004 | Zeller et al. | |
| 2010/0127673 A1 | 5/2010 | Iino et al. | |

\* cited by examiner

*Primary Examiner* — Stephen W Jackson
(74) *Attorney, Agent, or Firm* — Hackler Daghighian & Martino

(57) ABSTRACT

An overvoltage protector for an electrical consumer in a motor vehicle, includes an input for connection to the electrical system of a motor vehicle, an output for connection to the electrical consumer to be protected, and a ground terminal which is connected via a line to a branch point between the input and the output, wherein at least one component that blocks below a threshold voltage and conducts above the threshold voltage, and a switch connected in series with the component are located in the line, wherein the switch is controlled by a control circuit that closes the switch when a voltage spike occurs and subsequently reopens it.

13 Claims, 1 Drawing Sheet

DEVICE FOR PROTECTING AN ELECTRICAL CONSUMER AGAINST VOLTAGE SPIKES IN A MOTOR VEHICLE

The invention relates to an overvoltage protector for an electrical consumer in a motor vehicle, in particular a sensor in an exhaust system branch.

Voltage spikes can occur in motor vehicle electrical systems, which are problematic for and can cause damage to sensitive consumers such as sensors of exhaust gas treatment systems. The problem addressed by the present invention is that of demonstrating a way to prevent this as efficiently as possible.

This problem is solved by an overvoltage protector having the features herein below set forth.

An overvoltage protector according to the invention has a potential input for connection to the electrical system of a motor vehicle, a potential output for connection to the electrical consumer to be protected, and a ground terminal connected via a line to a branch point between the potential input and the potential output. A component that blocks below a threshold voltage and conducts above the threshold voltage, and a switch connected in series with the component are located in this line. The switch, e.g. a transistor, is controlled by a control circuit such that the switch is closed and subsequently reopened when a voltage spike occurs.

By using an overvoltage protector according to the invention, a required supply voltage of typically approximately 12 V can be reliably provided to a sensitive electrical consumer, e.g. a sensor in the exhaust system branch, while simultaneously providing protection against voltage spikes. The switch situated in the line leading to the ground output is open in the normal case i.e. in the absence of a voltage spike. The voltage present at the potential output of the overvoltage protector is therefore not reduced by a current flowing parallel to the consumer over the ground connection. If a voltage spike occurs, the switch is closed, thereby reducing the voltage present at the potential output by a current flowing over the ground connection, and a voltage spike is not forwarded to the potential output.

Advantageously voltage is supplied to a consumer connected to the potential output even when the switch is closed since a component that blocks below a threshold voltage and conducts above the threshold voltage is located in the line leading to the ground output. Such a component can be e.g. a varistor or a diode, in particular a zener diode, located in the reverse direction. When the switch is closed, a voltage that is greater than the threshold voltage is present at the component due to the momentary voltage spike. The component therefore transitions into the conducting state thereof, and so a current flows across the ground output parallel to the consumer to be protected, the current reducing the voltage present at the potential output of the overvoltage protector. Since the component blocks once more below the threshold voltage thereof, the voltage present at the potential output is not reduced to zero, but rather to a desired level. If the line contains only one such component, the threshold voltage of the component sets up at the potential output. If a plurality of such components is series-connected in the line, the voltage that results at the potential output is a function of the individual threshold voltages of the components.

Components such as diodes which are suitable for the overvoltage protector according to the invention are typically not suitable for sustained operation. However, since a switch which is open most of the time is located in the line leading to the ground output, voltage is always present at the component only for a very short time, which does not pose a problem.

Due to the combination according to the invention of a controlled switch and a component which blocks below a threshold voltage and conducts above the threshold voltage, an electrical consumer is protected against overvoltages and voltage is supplied even during a voltage spike.

SUMMARY OF THE INVENTION

In a method according to the invention for protecting a consumer in a motor vehicle against voltage spikes of a vehicle system voltage, a line connected in parallel to the consumer is therefore used, in which a component is installed which blocks below a voltage threshold and conducts above a voltage threshold, and in which a switch connected in series with the component is installed, wherein the switch is closed when a voltage pulse occurs and is reopened once it dies down.

The value of the vehicle system voltage or the slew rate thereof, for instance, can be used as the criterium for the closing of the switch. For example, a threshold value can be specified and the switch can be closed as soon as the vehicle system voltage exceeds the specified threshold value of e.g. 14 V. It is also possible to specify a threshold value for the slew rate of the vehicle system voltage and close the switch as soon as the slew rate of the vehicle system voltage exceeds a specified threshold value. It is also possible to combine these two criteria or other criteria with one another and close the switch only when two or more criteria are fulfilled.

In the simplest case, the switch can be reopened after a specified time period. This period can be markedly longer than the duration of a voltage pulse, but should be so short that the component connected in series with the switch is not damaged. It is also possible to use the same criteria for the opening of the switch that are used for the closing of the switch in a manner that has been modified accordingly, that is, to open the switch as soon as the vehicle system voltage drops below a specified threshold value.

Particularly advantageously, the time period after which the switch is reopened can be specified by the final discharge procedure of a capacitor. If a voltage pulse occurs, the capacitor becomes charged. The state of charge of the capacitor can be used to control a switch e.g. to specify the voltage at the gate of a field effect transistor used as a switch. The voltage at the capacitor can therefore be used to close a switch, preferably a field effect transistor, and to hold it in the closed state thereof until the voltage at the capacitor has fallen back below a threshold value due to the discharge thereof.

To ensure that the capacitor becomes charged when a voltage spike occurs, it can be connected to the potential input of the overvoltage protector or the vehicle electrical system via a component that blocks below a threshold voltage and conducts above the threshold voltage. Such a protective element, e.g. a diode connected in the reverse direction, is non-conductive at normal vehicle system voltage, and so the capacitor is not charged. During a voltage spike, however, the threshold voltage of the component is exceeded, and so it becomes conductive and the capacitor charges. The capacitor then begins to discharge and can therefore specify the time period after which the switch is reopened. If another voltage spike occurs during the final discharge procedure, this advantageously causes the capacitor—which is then partially discharged—to become fully recharged again, and the time period until the switch opens is extended accordingly.

According to an advantageous development of the overvoltage protector according to the invention, a switched-mode power supply is located between the potential input and the branch point, which induces a voltage increase when the vehicle system voltage drops. Such switched-mode power supplies are also referred to as boosters. If the vehicle system voltage drops for a short time period due to a high load, this can be compensated for using a switched-mode power supply, thereby enabling the overvoltage protector to still provide the expected voltage, e.g. 12 V, at the potential output. Sensitive consumers such as sensors in the exhaust system branch of a motor vehicle typically have low electrical energy which the motor vehicle electrical system can still provide with considerable ease even if loads are great. When a switched-mode power supply is used to compensate for voltage dips, the supply voltage of an electrical consumer, e.g. a sensor in the exhaust-gas branch of a vehicle, can therefore be advantageously stabilized.

BRIEF DESCRIPTION OF THE DRAWINGS

Further details and advantages of the invention are explained using an embodiment, with reference to the attached drawings. In the drawings.

DETAILED DESCRIPTION

Figure 1:
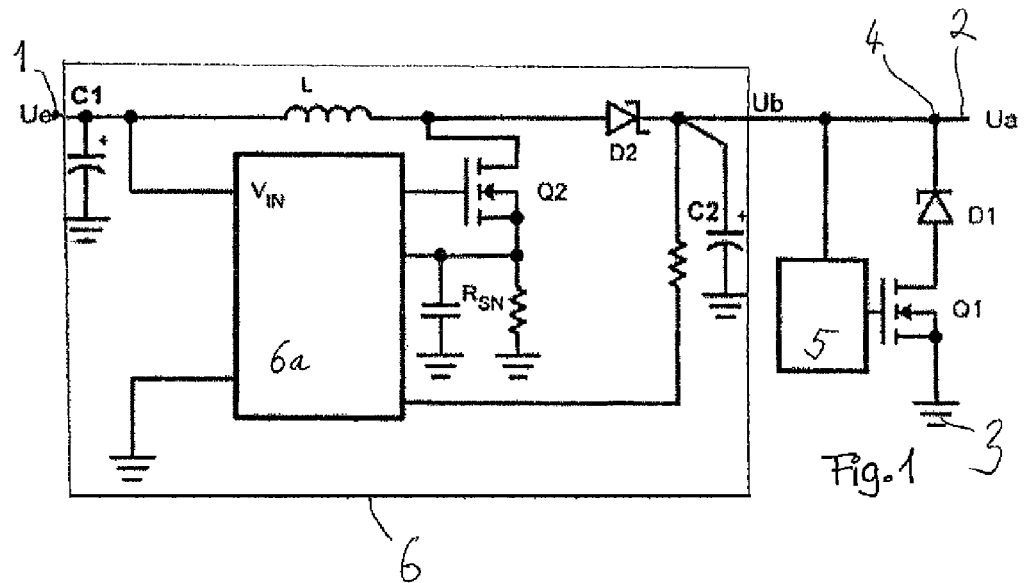
FIG. 1 shows an embodiment of an overvoltage protector according to the invention.

A sketched circuit diagram of an overvoltage protector for an electrical consumer in a motor vehicle is depicted schematically in FIG. 1. The overvoltage protector has a potential input 1 for connection to the electrical system of a motor vehicle, a potential output 2 for connection to the electrical consumer to be protected, and a ground terminal 3 connected via a line to a branch point 4 between potential input 1 and potential output 2. A diode D1, preferably a zener diode, is installed in the reverse direction in this line, and a switch Q1 connected in series with diode D1 is also located in this line. In the embodiment shown, switch Q1 is a field effect transistor and is controlled by a control circuit 5 depicted in FIG. 2. A switched-mode power supply 6 is located between branch point 4 and potential input 1 to compensate for voltage dips of the vehicle system voltage. When vehicle system voltage Ue at the potential input drops, switched-mode power supply 6 induces a voltage increase, thereby stabilizing voltage Ub present at branch point 4. Such switched-mode power supplies 6 are known as boosters. The details of switched-mode power supply 6, which is depicted schematically in FIG. 1, and control unit 6a thereof therefore require no further explanation.

The actual voltage of an electrical system can temporarily deviate considerably from a nominal voltage e.g. 12 V. The overvoltage protector that is shown still reliably provides the desired supply voltage for a consumer at potential output 2 thereof. A decreasing vehicle system voltage which occurs e.g. when a vehicle or a powerful consumer is started up is compensated for by switched-mode power supply 6, and so branch point 4 of the overload protector is at the desired electrical potential in this case as well.

If voltage spikes occur in the vehicle system voltage, they are not captured by switched-mode power supply 6, however. To protect a consumer connected to potential output 2 against voltage spikes, switch Q1 is closed when a voltage spike occurs. While a voltage spike is occurring, a voltage is present at diode D1 that is greater than the threshold voltage thereof. Diode D1 located in the reverse direction therefore becomes conductive, and so a current flows over ground terminal 3 parallel to the consumer. This current flows parallel to the consumer to be protected, thereby reducing the current present at potential output 2. Since diode D1 is conductive only above the threshold voltage thereof, voltage Ua present at potential output 2 does not break down entirely, but rather merely returns to the threshold voltage of diode D1. To ensure that diode D1 is not destroyed by a load that is sustained for a long period of time, switch Q1 is reopened after the voltage spike has passed.

Figure 2:
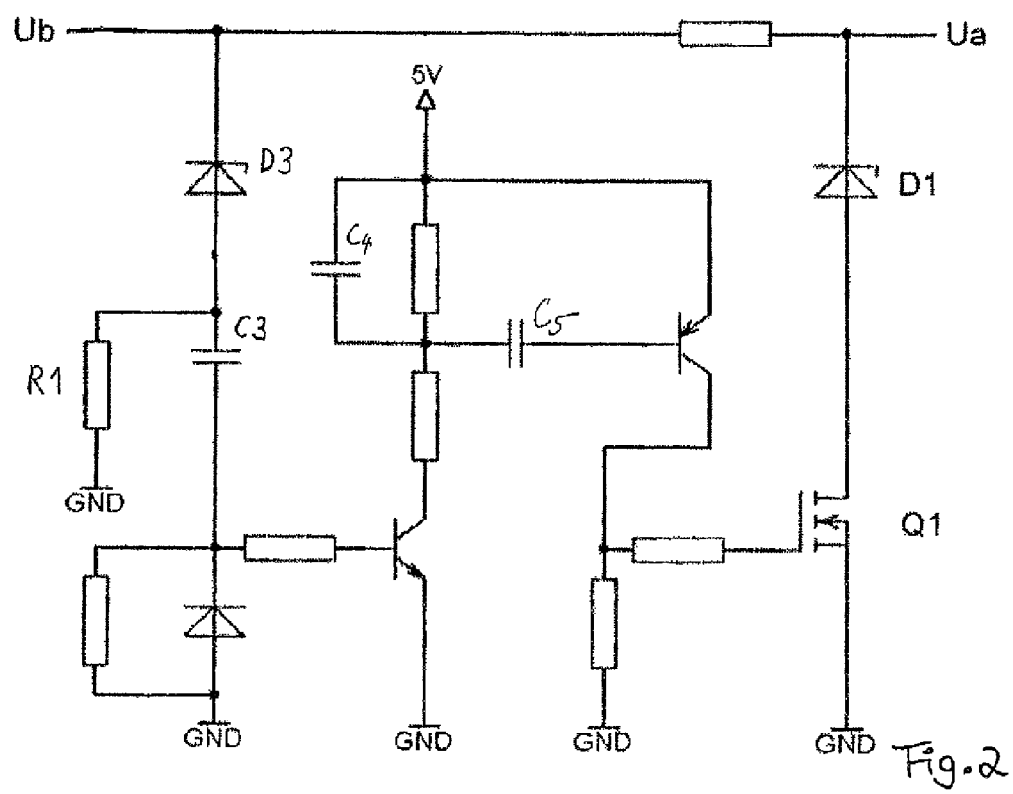
FIG. 2 shows an embodiment of the control circuit of the embodiment depicted in FIG. 1.

An example of control circuit 5 is depicted schematically in FIG. 2 which shows in greater detail the part of the overvoltage protector that does not belong to switched-mode power supply 6.

The control circuit shown in FIG. 2 includes a capacitor C3, the final discharge procedure of which specifies the time after which switch Q1 is reopened. Capacitor C3 is connected to potential input $U_b$ via a diode D3 located in the reverse direction. In the embodiment shown, diode D3 is a zener diode. Another component that blocks below a threshold voltage and conducts above the threshold voltage could be used, however, such as a varistor or another diode.

When a voltage spike occurs, a voltage is present at diode D3 that lies above the threshold voltage thereof, and so capacitor C3 becomes charged. Capacitor C3 then discharges across resistor R1. Capacitor C3 in combination with resistor R1 therefore forms an RC filter, the time constant of which specifies how quickly switch Q1 is reopened after a voltage pulse of switch Q1 occurs. The rapidity at which switch Q1 is reopened after a voltage pulse occurs can also be influenced by the capacitance of capacitors C4 and C5.

REFERENCE CHARACTERS

1 Potential input
2 Potential output
3 Ground connection
4 Branch point
5 Control circuit
6 Switched-mode power supply
6a Control unit of switched-mode power supply 6
C3 Capacitor
D1 Diode
D2 Diode
D3 Diode
Q1 Switch
R1 Resistor
R2 Resistor
R3 Resistor
Ue Vehicle system voltage

What is claimed is:

1. An overvoltage protector device for an electrical consumer in a motor vehicle, the device comprising:
   an input for connection of the protector device to an electrical system of a motor vehicle;
   an output for connection of the protector device to the electrical consumer to be protected;
   a ground terminal connected via a line to a branch point between the input and the output;
   a component for blocking below a threshold voltage and conducting above the threshold voltage;
   a switch connected in series with the component in the line;
   a control circuit for controlling the switch in order that the switch is closed when a voltage spike occurs and subsequently reopens, wherein the control circuit contains an RC filter having a capacitor charged when a voltage spike occurs and wherein the RC filter is connected to the input via a further element that blocks below the threshold voltage and conducts above the threshold voltage; and a resistor connected in parallel with the further element.

2. The device according to claim 1, wherein the protective element is a varistor or a zener diode located in a reverse direction.

3. The device according to claim 1, wherein a switched-mode power supply is disposed between the input and the branch point, which induces a voltage increase when the vehicle system voltage drops.

4. The device according to claim 1, wherein the switch is configured to close as soon as the rise rate of the vehicle system voltage exceeds a specified threshold value.

5. The device according to claim 1, wherein the switch is configured to reopen after a specified time.

6. The device according to claim 5, wherein the time after which the switch reopens is specified by discharging of a capacitor.

7. An overvoltage protector device for an electrical consumer in a motor vehicle, the device comprising:
- an input for connection of the protector device to an electrical system of a motor vehicle;
- an output for connection of the protector device to the electrical consumer to be protected;
- a ground terminal connected via a line to a branch point between the input and the output;
- a component for blocking below a threshold voltage and conducting above the threshold voltage;
- a switch connected in series with the component in the line;
- a control circuit for controlling the switch in order that the switch is closed when a voltage spike occurs and subsequently reopens; and
- a switched-mode power supply disposed between the input and the branch point, which induces a voltage increase when the vehicle system voltage drops.

8. The device according to claim 7, wherein the control circuit contains an RC filter, having a capacitor charged when a voltage spike occurs.

9. The device according to claim 8, wherein the RC filter is connected to the input via a further element that blocks below the threshold voltage and conducts above the threshold voltage.

10. The device according to claim 9, wherein a resistor is connected in parallel with the further element.

11. The device according to claim 7, wherein the switch is configured to close as soon as the rise rate of the vehicle system voltage exceeds a specified threshold value.

12. The device according to claim 7, wherein the switch is configured to reopen after a specified time.

13. The device according to claim 12, wherein the time after which the switch reopens is specified by discharging of a capacitor.

* * * * *